US012671106B2

(12) United States Patent     (10) Patent No.:   US 12,671,106 B2

Beaury et al.     (45) Date of Patent:    Jun. 30, 2026

(54) METHOD AND PROCESSING DEVICE FOR PRODUCING A STORAGE CELL FOR AN ELECTRICAL ENERGY STORAGE DEVICE, IN PARTICULAR OF A MOTOR VEHICLE, AND USE OF A PROCESSING DEVICE

(71) Applicant: Bayerische Motoren Werke Aktiengesellschaft, Munich (DE)

(72) Inventors: Alexander Beaury, Ruhpolding (DE); Christoph Born, Munich (DE); Simon Haerle, Munich (DE); Seokyoon Yoo, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 81 days.

(21) Appl. No.: 18/864,928

(22) PCT Filed: May 8, 2023

(86) PCT No.: PCT/EP2023/062085

§ 371 (c)(1),
(2) Date: Nov. 12, 2024

(87) PCT Pub. No.: WO2024/008349

PCT Pub. Date: Jan. 11, 2024

(65) Prior Publication Data

US 2025/0316743 A1    Oct. 9, 2025

(30) Foreign Application Priority Data

Jul. 8, 2022   (DE) ..................... 10 2022 117 045.4

(51) Int. Cl.
    *H01M 10/04*     (2006.01)

(52) U.S. Cl.
    CPC .... *H01M 10/0431* (2013.01); *H01M 2220/20* (2013.01)

(58) Field of Classification Search
CPC ......... H01M 10/0409; H01M 10/0431; H01M 2220/20; H01M 50/538; Y02E 60/10; Y02P 70/50
See application file for complete search history.

(56) References Cited

U.S. PATENT DOCUMENTS

2006/0024572 A1   2/2006   Lee
2012/0308872 A1   12/2012   Huang
       (Continued)

FOREIGN PATENT DOCUMENTS

CN       115425270 A    12/2022
DE   10 2021 001 982 A1   12/2021
       (Continued)

OTHER PUBLICATIONS

Written Opinion of PCT/EP2023/062085.*
       (Continued)

*Primary Examiner* — Sonya M Sengupta
(74) *Attorney, Agent, or Firm* — Crowell & Moring LLP

(57) ABSTRACT

A method for producing a storage cell for an electrical energy storage device includes providing an electrode winding having an electrode foil. A processing device is provided, having a base, which is rotatable about a base axis of rotation, and processing elements, which are each rotatable about an element axis of rotation relative to the base and which engage with a particular arcuate guide, assigned to the particular processing element, of the base. The base is rotated relative to the electrode winding, relative to the element axes of rotation and relative to the processing elements about the base axis of rotation, whereby the guides cause the processing elements to perform a particular pivoting movement about the element axes of rotation relative to the electrode winding, relative to the base and toward the base axis of rotation.

10 Claims, 7 Drawing Sheets

(56) References Cited

U.S. PATENT DOCUMENTS

| | | | |
|---|---|---|---|
| 2014/0087231 | A1 | 3/2014 | Schaefer et al. |
| 2024/0204360 | A1 | 6/2024 | Doraciak et al. |

FOREIGN PATENT DOCUMENTS

| | | |
|---|---|---|
| DE | 10 2012 208 726 B4 | 3/2022 |
| EP | 2 684 235 B1 | 7/2017 |
| JP | 2001-118562 A | 4/2001 |
| WO | WO 2017/129323 A1 | 8/2017 |
| WO | WO 2022/191591 A1 | 9/2022 |
| WO | WO 2022/220402 A1 | 10/2022 |

OTHER PUBLICATIONS

International Search Report (PCT/ISA/210) issued in PCT Application No. PCT/EP2023/062085 dated Aug. 22, 2023 with English translation (5 pages).

German-language Written Opinion (PCT/ISA/237) issued in PCT Application No. PCT/EP2023/062085 dated Aug. 22, 2023 with English translation (9 pages).

German-language Search Report issued in German Application No. 10 2022 117 045.4 dated Jan. 26, 2023 with partial English translation (12 pages).

* cited by examiner

METHOD AND PROCESSING DEVICE FOR PRODUCING A STORAGE CELL FOR AN ELECTRICAL ENERGY STORAGE DEVICE, IN PARTICULAR OF A MOTOR VEHICLE, AND USE OF A PROCESSING DEVICE

BACKGROUND AND SUMMARY

The invention relates to a method and to a processing device for producing a storage cell for an electrical energy storage device, in particular of a motor vehicle. The invention also relates to the use of such a processing device.

A method for producing a separator for use in an electrochemical battery cell of a lithium-ion battery is revealed as known by DE 10 2012 208 726 B4. EP 2 684 235 B1 discloses an energy storage device having a plurality of storage cells. Furthermore, WO 2017/129323 A1 discloses a foil structure for a battery for dispensing on a round body. DE 10 2021 001 982 A1 also discloses a cell connector for connecting at least two diverters and/or stranded wires.

The object of the present disclosure is to provide a method, a processing device and the use of such a processing device, so that storage cells for electrical energy storage devices, in particular of motor vehicles, can be produced in a particularly time-efficient and cost-effective manner with particular process reliability.

According to the disclosure, this object may be achieved by a method and processing device having the features of the independent claims and by a method of use having the features of a dependent claim. Other dependent claims relate to advantageous refinements of the invention.

A first aspect of the disclosure relates to a method for producing a storage cell, also referred to simply as a cell, for an electrical energy storage device, in particular of a motor vehicle. Electrical energy can be, in particular electrochemically, stored by the storage cell, in particular in the fully produced state of the storage cell. The electrical energy storage device has, in its fully produced state, the storage cell and a plurality of further storage cells, where the statements relating to the storage cell made above and in the text which follows can also be readily transferred to the other, further storage cells, and vice versa. In the completely produced state of the electrical energy storage device, the storage cells of the electrical energy storage device are, for example, electrically connected to each other, so that electrical energy can be, in particular electrochemically, stored by the electrical energy storage device. The electrical energy storage device is preferably a high-voltage component, the electrical voltage, in particular electrical operating voltage or rated voltage, of which is preferably greater than 50 volts, in particular greater than 60 volts, and is very preferably several hundred volts. The electrical energy storage device is used, for example, as what is known as a traction storage device. This means that, in the fully produced state of the motor vehicle equipped with the electrical energy storage device, the motor vehicle has at least one electric machine by which the motor vehicle can be, in particular purely, electrically driven. In order to drive the motor vehicle by the electric machine, the electric machine is supplied with the electrical energy stored in the electrical energy storage device. The electric machine is preferably a high-voltage component, the electrical voltage, in particular electrical operating or rated voltage, of which is preferably greater than 50 volts, in particular preferably greater than 60 volts, and is very preferably several hundred volts.

In the method according to this disclosure for producing the storage cell, an electrode winding is provided. The electrode winding has at least one electrode foil, which is also referred to as the first electrode foil. The electrode foil is wound up to form the electrode winding, for example around an imaginary winding axis. In particular, the electrode winding has, for example, a further, second electrode foil which is wound up to form the electrode winding, in particular around the imaginary winding axis, so that the electrode foils are wound up to form the electrode winding, in particular around the imaginary winding axis, for example. Very particularly, the electrode winding has, for example, a separator which is arranged between the electrode foils and is wound up to form the electrode winding, in particular with the electrode foils, in particular around the imaginary winding axis, for example. The electrode winding is also referred to as a jelly roll. In the fully produced state of the storage cell, the first electrode foil is or forms, for example, a first electrical pole of the storage cell, wherein the first electrical pole has a first electrical polarity. By way of example, the second electrode foil forms a second electrical pole of the storage cell in the fully produced state of the storage cell, wherein the second electrical pole has a second electrical polarity which is different from the first electrical polarity. Where the text above and that which follows mentions the electrode foil, this is to be understood to mean the first electrode foil, unless indicated otherwise. The statements relating to the electrode foil, and consequently relating to the first electrode foil, made above and in the text which follows can also be readily transferred to the second electrode foil, and vice versa.

For example, the electrode foil is or forms an electrode of the storage cell, so that, for example in the fully produced state of the storage cell, the electrode foil is or forms the mentioned electrode or is a constituent part of the electrode. Therefore, for example in the method according to the disclosure, the mentioned electrode of the storage cell is produced from the electrode foil. For example, the electrode foil is an anode foil, so that the mentioned electrode is an anode of the storage cell, and so that for example the electrical pole, formed by the electrode foil, of the storage cell is a negative electrical pole of the storage cell. It is further conceivable that the electrode foil is a cathode foil, so that the electrode is a cathode of the storage cell. Therefore, the electrical pole, formed by the electrode foil, of the storage cell is a positive electrical pole of the storage cell. The electrical energy can be, in particular electrochemically, stored in the storage cell by the electrode and therefore by the electrode foil. In addition, the electrical energy stored in the storage cell can be provided by the electrode of the storage cell and therefore can be transferred, for example, to a component provided in addition to the storage cell, as a result of which the component can be supplied with the electrical energy stored in the storage cell. The component is, for example, the mentioned electric machine. For example, a cell housing, also referred to simply as housing, of the storage cell is provided in the method, wherein the electrode winding can be arranged in the housing.

In order to now be able to produce the storage cell in a time-efficient and cost-effective manner and with process reliability, a processing device is provided in the method according to the disclosure. The processing device, also referred to simply as device, has a base which is rotatable about a base rotation axis and is also referred to as base element. For example, the base may be in the form of a disk, and therefore the base may also be referred to as base disk. The processing device also has a plurality of processing elements, which are also referred to as segments or processing segments. The processing elements are each rotatable relative to the base about a respective element rotation axis running parallel to the base rotation axis and spaced apart from the base rotation axis. In other words, the respective processing element can be rotated or pivoted relative to the base about its respective element rotation axis running parallel to the base rotation axis and spaced apart from the base rotation axis. In this case, the element rotation axes are arranged spaced apart from one another, in particular in the circumferential direction, distributed around the base rotation axis, of the base. In particular, the element rotation axes are arranged on a common circle, the center point of which preferably lies on the base rotation axis. For example, the processing elements are held on a main device in a manner rotatable, in particular pivotable, relative to the main device, in particular processing device. It is, in particular, conceivable here that the base is rotatable relative to the main device and in particular also relative to the element rotation axes about the base rotation axis.

A respective, arcuate guide of the base is associated with the respective processing element. The base is rotatable relative to the element rotation axes and therefore preferably also relative to the main device about the base rotation axis. In particular, the guide is a slotted guide, designed as a groove or passage slot for example, wherein the respective processing element engages into the respective guide associated with the respective processing element.

In the method, the base is rotated relative to the electrode winding and relative to the element rotation axes and therefore, for example, also relative to the main device about the base rotation axis, as a result of which a respective pivoting movement of the processing elements about the element rotation axes taking place relative to the electrode winding, relative to the base and, for example, also relative to the main device and in the direction of the base rotation axis is implemented by the guides. In other words, on account of the base being rotated relative to the electrode winding and relative to the element rotation axes and preferably also relative to the main device about the base rotation axis while the processing elements engage into the associated, respective guides, the guides cause the processing elements engaging into the guide to execute the respective, described pivoting movement, in the course of which the respective processing element is pivoted about its respective element rotation axis in the direction of the base rotation axis. Therefore, owing to the guides and owing to the processing elements engaging into the guides, positive guidance is provided, by way of which the processing elements are pivoted relative to the base and also relative to the electrode winding in the direction of the base rotation axis about the element rotation axes when the base is rotated relative to the element rotation axes about the base rotation axis.

At least one subregion of the electrode foil, the subregion being arranged on an end side of the electrode foil, is folded over, in particular bent over, in particular about a folding axis, in particular bending axis, by the processing elements as a result of the implemented pivoting movements of the processing elements. For example, the subregion is folded over in the direction of the base rotation axis by the processing elements as a result of the implemented pivoting movements of the processing elements. The, in particular entire, subregion can be folded over in a time-saving and precise manner, that is to say without respective parts of the subregion having to be folded over one after the other and/or by hand, by the processing elements and the pivoting movements thereof.

In a particularly advantageous embodiment, the electrode foil, wound up to form the electrode winding, of the electrode winding has contacting lugs on its end side, the contacting lugs also being referred to simply as lugs or tabs and protruding from a main body of the electrode foil, in particular in the axial direction of the electrode winding. The axial direction of the electrode winding runs along the winding axis, wherein in particular the axial direction of the electrode winding coincides with the winding axis. In this case, the subregion has the contacting lugs. In other words, the contacting lugs are constituent parts, in particular the abovementioned parts, of the subregion of the electrode foil. Again expressed in other words: the contacting lugs are regions of the electrode foil, wherein the regions follow one another and are separated from one another in the circumferential direction running around the axial direction of the electrode winding, wherein however the regions, and consequently the contacting lugs, are connected to the main body or held on the main body and therefore connected to each other or held against each other by the main body. In particular, the electrode foil is wound up in a spiral manner to form the electrode winding, so that the electrode foil, on its end side on which the contacting lugs are arranged, runs along a spiral line. The abovementioned feature that the contacting lugs are separated from each other in the circumferential direction of the electrode winding running around the axial direction of the electrode winding and therefore around the winding axis and at least partially follow one another is to be understood to mean, in particular, that the contacting lugs follow one another and are separated from one another as viewed along the spiral line, wherein the contacting lugs are held on the main body and are held against each other by the main body. As a result, it is possible to fold over, in particular to bend over, the respective contacting lug, in particular about a respective folding or bending axis, relative to the main body and in particular in the direction of the main body. Since the contacting lugs are separated from each other as viewed in the circumferential direction of the electrode winding or along the spiral line, it is possible for example in principle to fold over, in particular to bend over, for example one of the contacting lugs in particular about the folding or bending axis of the one contacting lug relative to the main body and relative to the other contacting lugs in particular in the direction of the main body. However, in this case, it is desirable to fold over, in particular to bend over, the or all of the contacting lugs, in particular at the same time, relative to the main body in order to thereby allow, for example, in particular electrical and/or mechanical, connection over a large surface area to a contact element formed separately from the electrode foil. Therefore, provision is preferably made for the contacting lugs to be folded over, in particular bent over, by the processing elements as a result of the implemented pivoting movements of the processing elements in the direction of the main body, in particular about a respective folding axis, in particular bending axis, of the respective contacting lugs. As a result, the or all of the contacting lugs can be folded over, in particular bent over, in particular at the same time, relative to the main body and in particular in the direction of the main body in a time-saving and cost-effective manner and with process reliability.

For example, in the method, the electrode winding is moved relative to the processing device in such a way that at least the subregion, in particular respective lug subregions of the contacting lugs, are moved into an operative region of the processing elements, after which the subregion, in particular at least the respective lug subregions of the contacting lugs, is or are arranged in the operative region. For example, the processing elements are initially outside the operative region. On account of the processing elements, as described above, being pivoted in the direction of the base rotation axis, the processing elements are moved into the operative region, as a result of which for example the processing elements come into at least indirect, in particular direct, supporting contact with the subregion of the electrode foil, in particular with the respective contacting lugs, and, in particular in the event of further pivoting of the processing elements in the direction of the base rotation axis, fold over, in particular bend over, the subregion, in particular the contacting lugs.

The technology is based in particular on the following findings and considerations: for first samples and prototypes, the contacting lugs were removed in a precise but very complicated manner to the inside by hand and thus folded over in the direction of the main body. This does not come into consideration for producing relatively large numbers with an adequate series quality since sweat from hands, particles on hands etc. may lead to undesired contamination. In addition, folding over the contacting lugs by hand is very time-consuming and therefore costly. In contrast, the technology now allows time-efficient and cost-effective folding over, in particular bending over, of the contacting lugs with process reliability in the direction of the main body. For this purpose, the base is rotated, and therefore executes a particularly space-saving rotational movement. Owing to the described positive guidance, the processing elements are pivoted in the direction of the base rotation axis, and consequently inward, as a result of the rotational movement of the base, so that the respective processing element executes its respective, above-described pivoting movement. As a result of the pivoting movement of the processing elements, the contacting lugs are folded over, in particular bent over, in the direction of the main body, in particular in the direction of the winding axis. The technology allows the contacting lugs to be folded over at the same time and in a space-saving manner and therefore in a time-efficient and cost-effective manner and with process reliability here, wherein excessive contamination and other adverse effects can be avoided.

The contacting lugs can be, for example, rectangular or have a shape that differs from a rectangle. For example, the contacting lugs can be trapezoidal.

In order to be able to realize, by way of the positive guidance, a particularly advantageous pivoting movement of the processing elements and thus consequently be able to particularly advantageously fold over the subregion, in particular the contacting lugs, provision is made in one embodiment for the respective guide to be ellipsoidal, that is to say in the form of a segment of an arc of an ellipse.

A further embodiment is distinguished in that the base has a first tooth system, in particular a first external tooth system, into which a second tooth system, in particular a second external tooth system, of a gear wheel, also referred to as a pinion, engages. The gear wheel is rotated about a gear wheel rotation axis running parallel to the base rotation axis and parallel to the respective element rotation axis and spaced apart from the base rotation axis and from the respective element rotation axis, as a result of which the base is driven and thereby rotated about the base rotation axis. As a result, the base can be rotated in a particularly precise and time-efficient and cost-effective manner, so that the contacting lugs can be folded over in a precise and time-efficient and cost-effective manner.

In order to be able to produce the storage cell in a particularly time-efficient and cost-effective manner, a further refinement of the technology provides that the subregion, in particular the contacting lugs, after it has, in particular after they have each, been folded over is or are mechanically and electrically connected to the abovementioned contact element, which is in particular common to the contacting lugs and formed separately from the subregion, in particular separately from the contacting lugs. The contact element is, for example, a contact plate. The storage cell can advantageously provide the electrical energy via the contact element. Folding over the subregion, in particular the contacting lugs, allows mechanical and electrical connection of the subregion, in particular the contacting lugs, over a particularly large surface area to the contact element, so that the storage cell can provide and store the electrical energy particularly advantageously, in particular particularly effectively and efficiently.

In order to be able to connect the subregion, in particular the contacting lugs, to the contact element in a particularly time-efficient and cost-effective manner and particularly securely, a further refinement of the technology provides that the subregion, in particular the contacting lugs, is or are welded to the contact element and thus mechanically and electrically connected to the contact element.

In order to be able to implement particularly time-efficient and cost-effective manufacture, a further refinement of the technology provides that the contacting lugs are formed in one piece with the main body and thus in one piece with each other. This means that the contacting lugs and the main body are formed from a single piece, so that the contacting lugs and the main body are formed by a monoblock or are in the form of a monoblock. Again expressed in other words, the contacting lugs and the main body are not composed of a plurality of elements formed separately from each other and connected to each other, but rather the contacting lugs and the main body are formed by an integral body formed in one piece and thus integrally, the body being formed from a single piece and for example being in the form of the abovementioned monoblock.

It has proven to be further particularly advantageous when the subregion, in particular the contacting lugs, is or are formed from a metal material. As a result, production can be realized in a particularly time-efficient and cost-effective manner.

The subregion, in particular the contacting lugs, and the contact element are preferably formed from the same, in particular metal, material.

Finally, it has been found to be particularly advantageous when the base is rotated about the base rotation axis by an electric motor. As a result, the base can be rotated in a particularly precise and time-efficient and cost-effective manner, so that the storage cell can be produced in a time-efficient and cost-effective manner.

A second aspect of the disclosure relates to a processing device for producing a storage cell for an electrical energy storage device. The processing device according to the second aspect is very preferably used as the processing device of the first aspect. The processing device according to the second aspect of the invention has a base rotatable about a base rotation axis and a plurality of processing elements which are each rotatable relative to the base about a respective element rotation axis running parallel to the base rotation axis and spaced apart from the base rotation axis and which engage a respective arcuate guide, associated with the respective processing element, of the base rotatable relative to the element rotation axes about the base rotation axis, so that a respective pivoting movement of the processing elements taking place relative to the base and in the direction of the base rotation axis can be implemented by the guides owing to rotation of the base running relative to the element rotation axes about the base rotation axis. Advantages and advantageous refinements of the first aspect of the invention are to be considered advantages and advantageous refinements of the second aspect of the invention, and vice versa.

The processing device is constructed, as it were, in the manner of an iris diaphragm since the processing elements, like segments of such an iris diaphragm, can be pivoted or are pivoted inward relative to the base, and consequently in the direction of the base rotation axis, when the base is rotated relative to the element rotation axes about the base rotation axis. As a result, the or all of the contacting lugs can be bent over at the same time and therefore in a time-efficient and cost-effective manner and with process reliability.

A third aspect of the invention relates to the use of a processing device according to the second aspect of the invention, wherein the processing device is used in order to produce a storage cell for an electrical energy storage device, in particular of the motor vehicle. Advantages and advantageous refinements of the first aspect and of the second aspect of the invention are considered to be advantages and advantageous refinements of the third aspect of the invention, and vice versa.

Further details of the invention can be found in the following description of a preferred exemplary embodiment together with the associated drawings.

BRIEF DESCRIPTION OF THE DRAWINGS

Identical or functionally identical elements are provided with the same reference signs in the figures.

DETAILED DESCRIPTION OF THE DRAWINGS

A method for producing a storage cell for an electrical energy storage device of a motor vehicle will be explained below with reference to the figures. An electrode winding 1, shown in a schematic perspective view in FIG. 1, of the storage cell is produced in the method. In particular, the electrode winding 1 is processed by a processing device 2 in the method. The electrode winding 1 is provided in the method. The electrode winding 1 has a first electrode foil, a second electrode foil and a separator, where the electrode foils and the separator are wound up, in particular about an imaginary winding axis, to form the electrode winding 1. For example, the electrode foils and the separator, before they are wound up to form the electrode winding 1, are initially stacked on one another, in particular along a stacking direction, in particular in such a way that the separator is arranged between the electrode foils. As a result, the electrode foils and the separator form a stack in which the separator is arranged between the electrode foils in particular as viewed along the stacking direction. The stack is wound up, in particular about the imaginary winding axis, to form the electrode winding 1.

Figure 11:
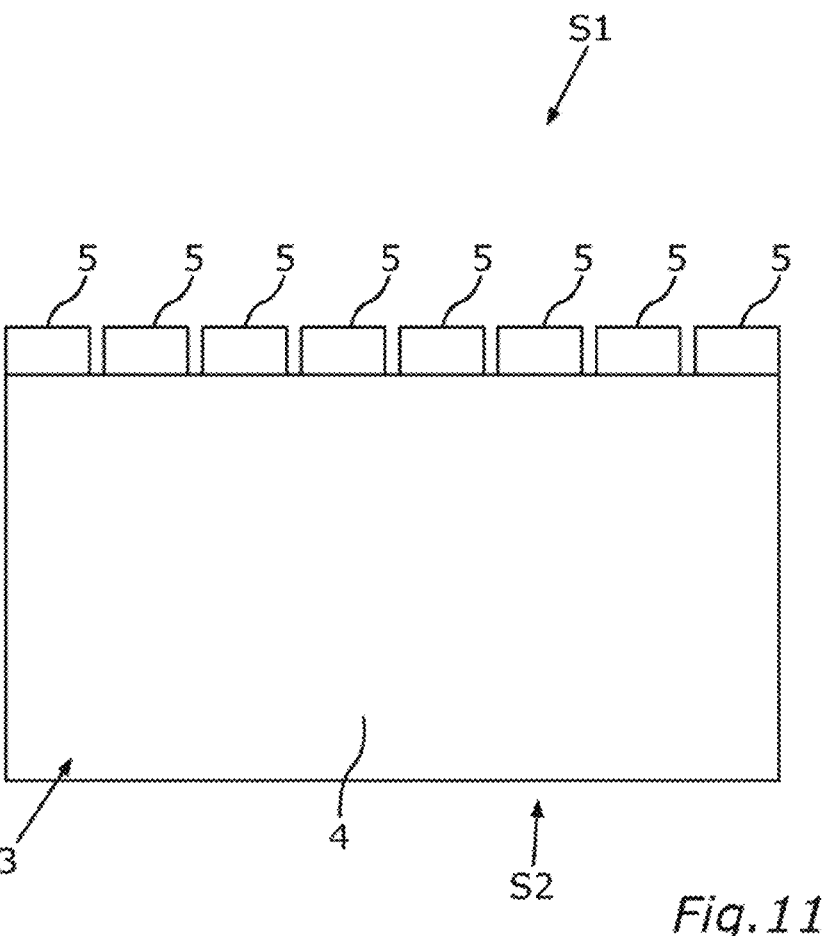
FIG. 11 shows a schematic, unwound view of an electrode foil of the electrode winding.

An unwound view of one of the electrode foils is shown by way of example in FIG. 11, the electrode foil being designated 3. The electrode foil 3 can be the first electrode foil or the second electrode foil, and therefore the statements relating to the electrode foil 3 made above and in the text which follows can be transferred both to the first electrode foil and to the second electrode foil, and vice versa. The electrode foil 3 can be, for example, a cathode foil and therefore be or form an electrode of the storage cell in the form of a cathode. It is further conceivable that the electrode foil 3 is an anode foil and therefore is or forms an electrode of the storage cell in the form of an anode. The electrode foil 3 is preferably formed from a metal material, in particular from copper or aluminum. In particular, FIG. 11 shows the electrode foil 3 in a state in which the electrode foil 3 has not yet been wound up to form the electrode winding 1. It can be seen that the electrode foil 3 has a main body 4 and contacting lugs 5 protruding from the main body 4. The contacting lugs 5 are preferably formed in one piece with the main body 4 and therefore in one piece with each other.

Figure 1:
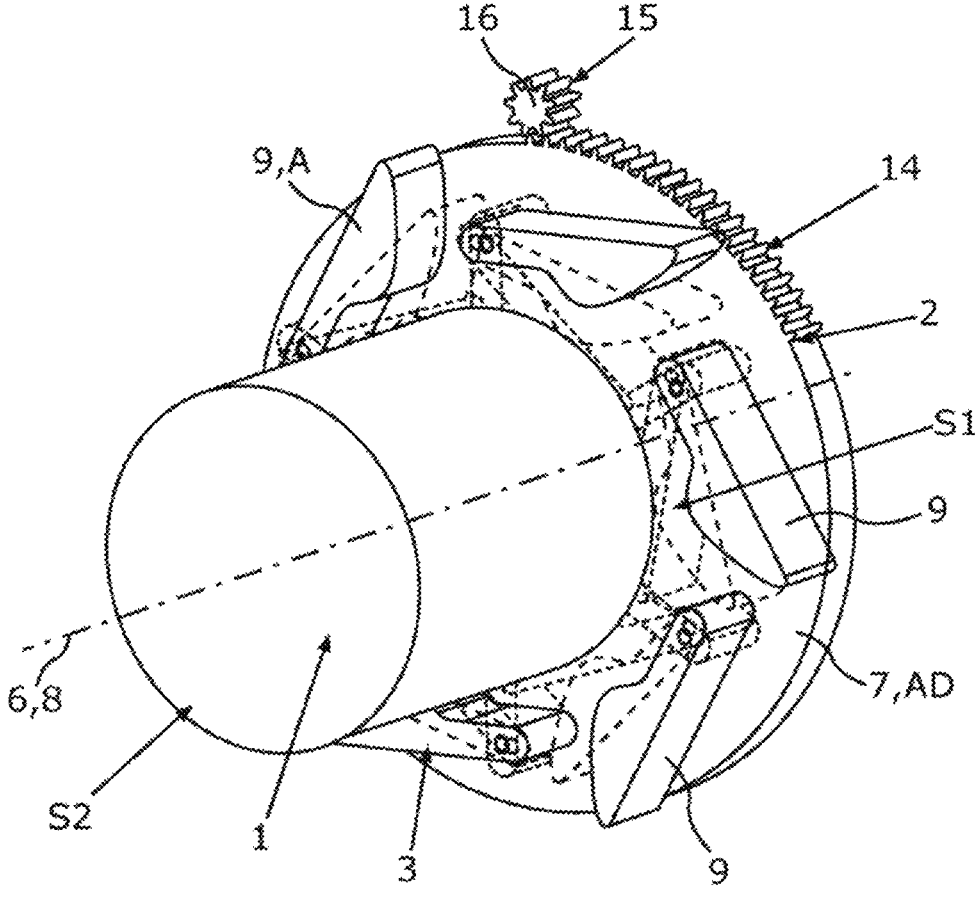
FIG. 1 shows a schematic perspective view of an electrode winding for a storage cell of an electrical energy storage device, where the electrode winding is processed by a processing device in a method for producing the storage cell.

The, in particular, imaginary winding axis about which the electrode foils and the separator are wound up to form the electrode winding 1 is designated 6 in FIG. 1. The electrode foil 3 has the contacting lugs 5 on its axial end side S1 when it is wound up to form the electrode winding 1. It can be seen in FIG. 1 that the axial end side S1 of the electrode foil 3 wound up to form the electrode winding 1 coincides entirely with a first axial end side of the electrode winding 1. The electrode foil 3, in the state in which it is wound up to form the electrode winding 1, also has a second axial end side S2, which is situated opposite the first axial end side S1 or is averted from the first axial end side S1 when viewed in the axial direction of the electrode winding 1 and therefore along the winding axis 6. The second axial end side S2 of the electrode foil 3 that has been wound up to form the electrode winding 1 coincides entirely with a second axial end side of the electrode winding 1, so that the axial end sides of the electrode winding 1 and therefore the electrode foil 3 are averted from each other in the axial direction of the electrode winding 1, the axial direction of which runs along the winding axis 6. In this case, the contacting lugs 5 protrude from the main body 4 in the axial direction of the electrode winding 1. In FIG. 1, the first axial end side S1, on which the contacting lugs 5 are arranged, is averted from the viewer of FIG. 1. It can be seen that the contacting lugs 5 are arranged in a subregion of the electrode foil 3 that is arranged on the end side S1, and consequently are constituent parts of the subregion of the electrode foil 3.

The processing device 2 is provided in the method. The processing device 2 has a base 7 which is in the form of a disk in the present case and is also referred to as a base disk and is rotatable about a base rotation axis 8. In the present case, the base rotation axis 8 coincides with the winding axis 6. It can be seen particularly clearly in FIGS. 2 to 10 that the processing device 2 has a plurality of processing elements 9. The respective processing element 9 is rotatable relative to the base 7 and also relative to the electrode winding 1 about a respective element rotation axis 10. The respective element rotation axis 10 runs parallel to the base rotation axis 8 and is spaced apart from the base rotation axis 8. In addition, the element rotation axes 10, which run parallel to each other, are spaced apart from each other.

Figure 3:
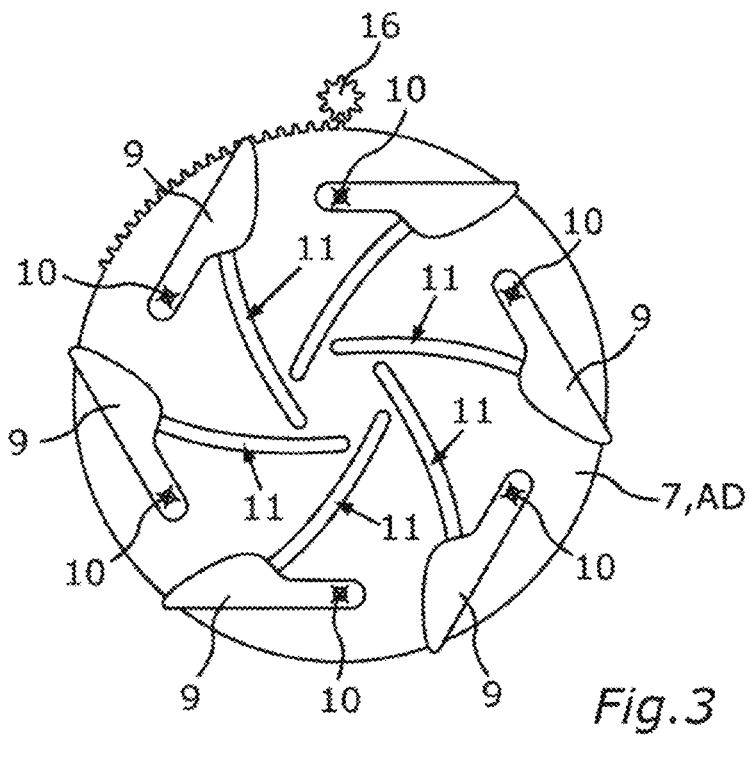
FIG. 3 shows a schematic front view of the processing device, where processing elements of the processing device are in a starting position.
Figure 4:
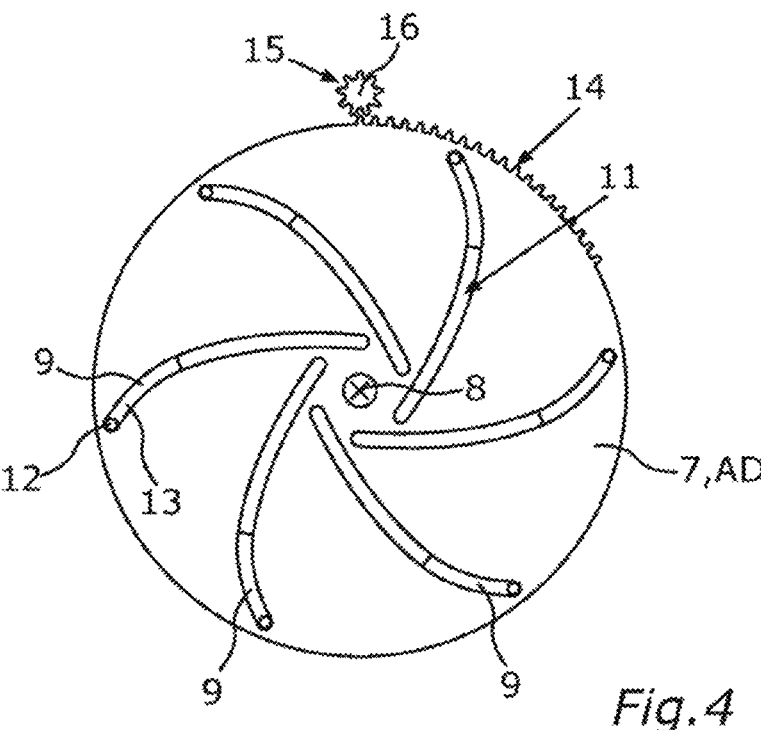
FIG. 4 shows a schematic rear view of the processing device according to FIG. 3.

It can be seen particularly clearly in FIGS. 3 and 4 that a respective guide 11 of the base 7, also referred to as base element, is associated with the respective processing element 9, where the respective processing element 9 engages into the respective guide 11, associated with the respective processing element 9, of the base 7. As can be seen in FIG. 4, the respective processing element 9 has, for example, a respective projection 12 for this purpose, the projection protruding from a respective base body 13 of the respective processing element 9, in particular along a direction of extent. The direction of extent runs, for example, parallel or obliquely to the respective element rotation axis 10. In the exemplary embodiment shown in the figures, the respective guide 11 is in the form of a passage slot. In this case, the respective guide 11 is arcuate, in particular ellipsoidal. In addition, the base 7 is rotatable relative to the element rotation axes 10 about the base rotation axis 8.

In the method, the base 7 is rotated relative to the electrode winding 1 and relative to the element rotation axes 10 about the base rotation axis 8, as a result of which a respective pivoting movement of the processing elements 9 engaging into the guides 11 about the element rotation axes 10 taking place relative to the electrode winding 1, relative to the base 7 and in the direction of the base rotation axis 8 is implemented by the guides 11. The contacting lugs 5 are folded over, in particular bent over, in particular about a respective folding axis, in particular bending axis, of the respective contacting lug 5 in the direction of the main body 4 and in so doing in particular in the direction of the winding axis 6 by the processing elements 9 as a result of the pivoting movements of the processing elements 9.

Figure 2:
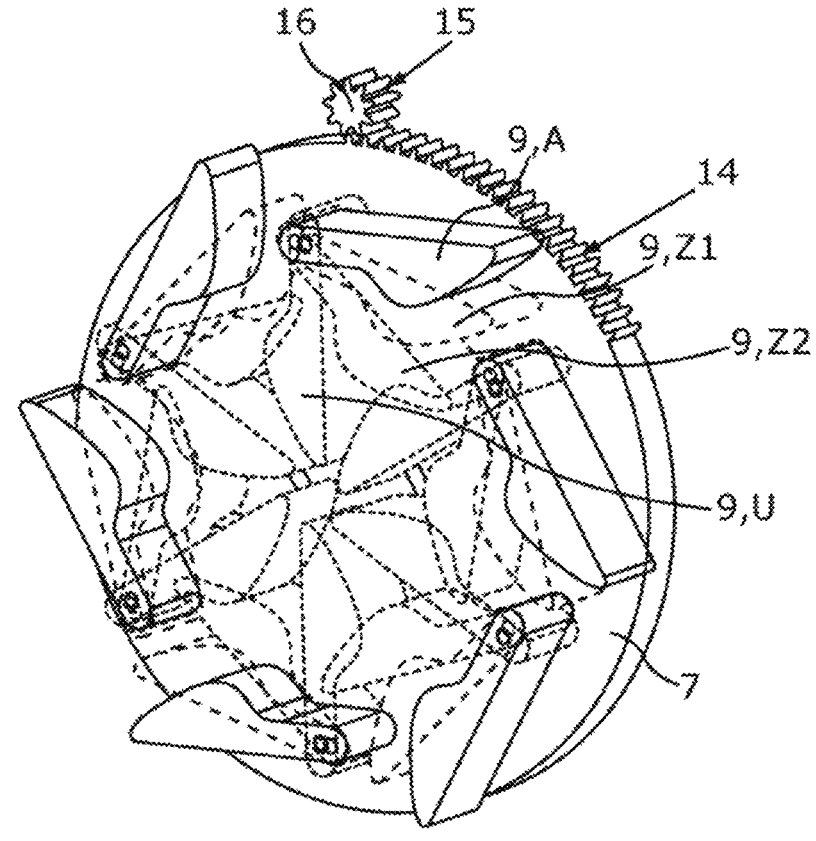
FIG. 2 shows a schematic and perspective front view of the processing device.

FIGS. 1 and 2 show different positions of the respective processing element 9. A first of the positions of the respective processing element 9 is a starting position A. A second of the positions of the respective processing element 9 is a first intermediate position Z1, and a third of the respective positions of the respective processing element 9 is a second intermediate position Z2. A fourth of the respective positions of the respective processing element 9 is a respective folded-over position U of the respective processing element 9. Owing to the rotation of the base 7, the processing elements 9 are pivoted out of the respective starting position A into the respective folded-over position U. The respective processing element 9 enters the intermediate positions Z1 and Z2 on its way from the starting position A into the folded-over position U.

Figure 5:
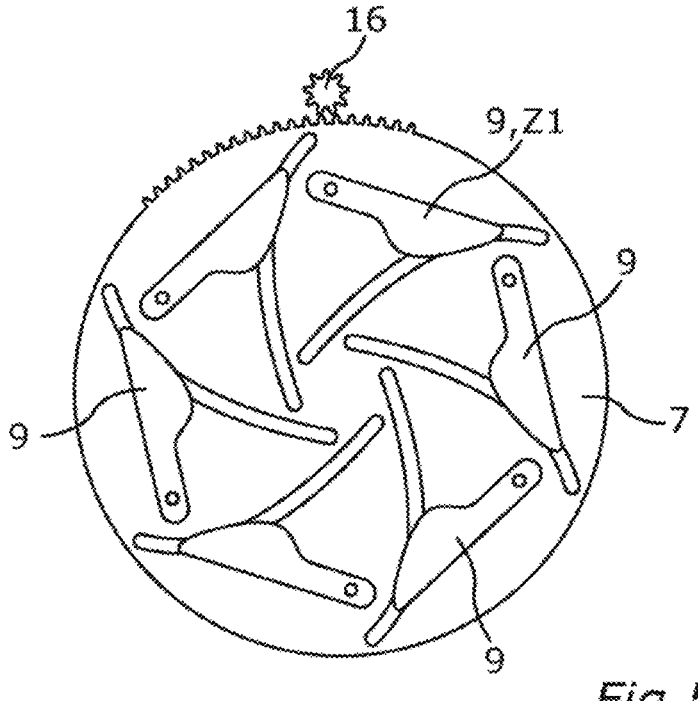
FIG. 5 shows a schematic front view of the processing device, where the processing elements are in a respective, first intermediate position.
Figure 6:
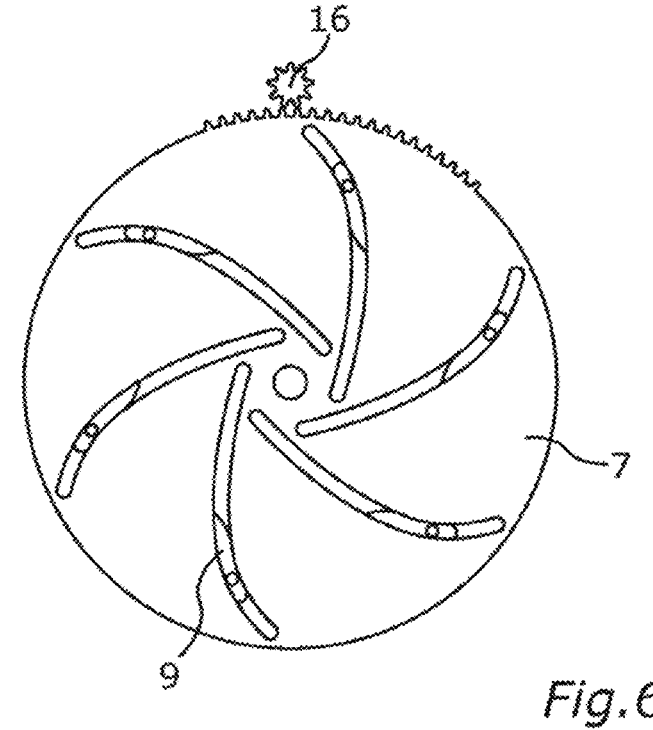
FIG. 6 shows a schematic rear view of the processing device according to FIG. 5.
Figure 7:
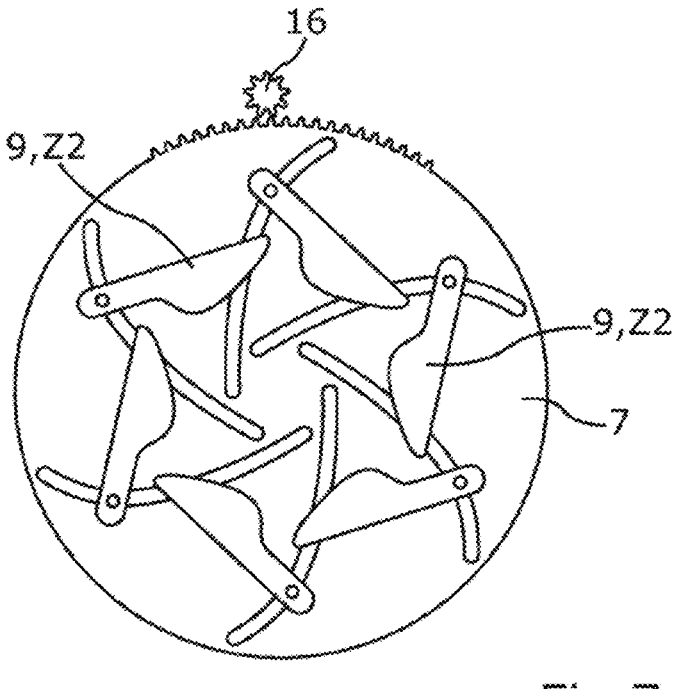
FIG. 7 shows a schematic front view of the processing device, where the processing elements are in a respective, second intermediate position.
Figure 8:
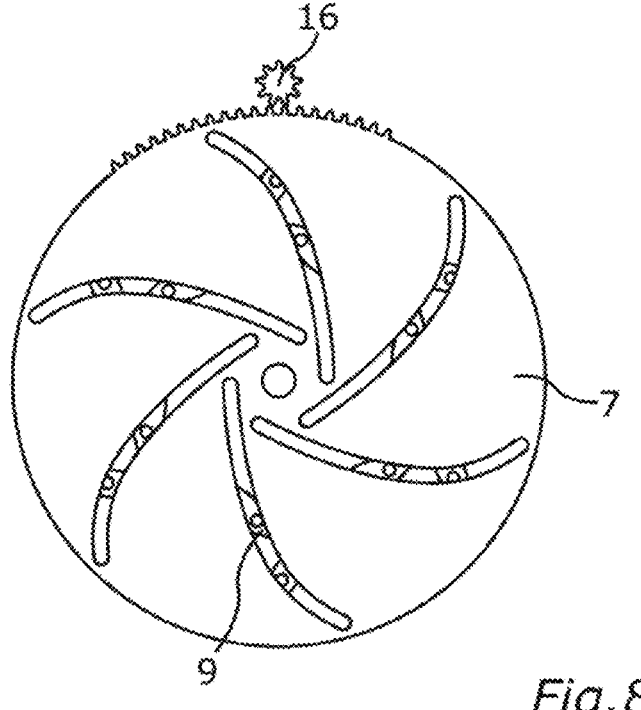
FIG. 8 shows a schematic rear view of the processing device according to FIG. 7.
Figure 9:
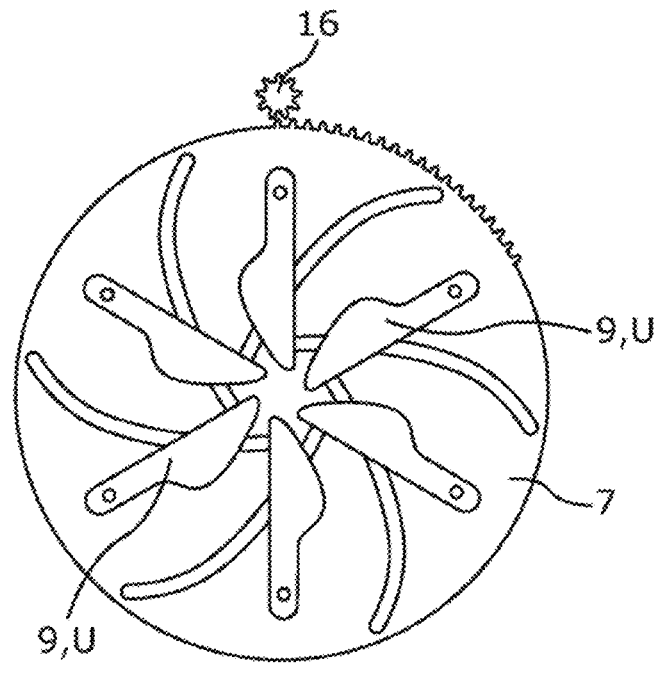
FIG. 9 shows a schematic front view of the processing device, where the processing elements are in a respective folded-over position.
Figure 10:
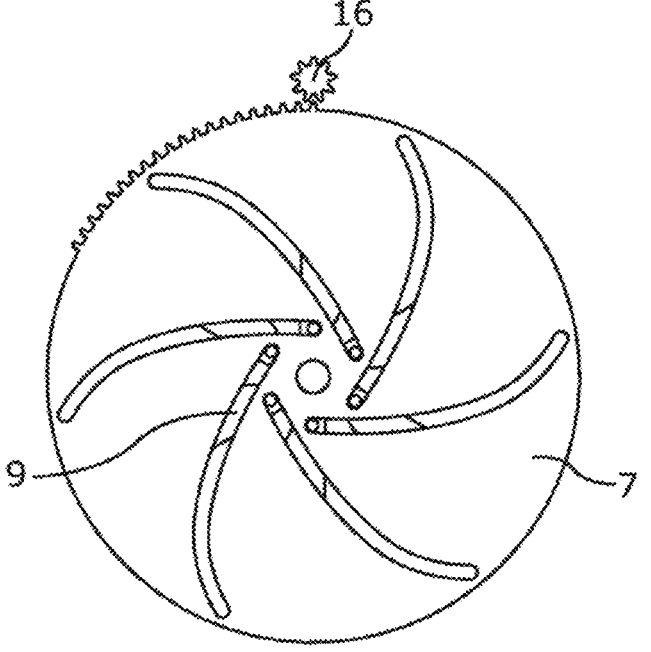
FIG. 10 shows a schematic rear view of the processing device according to FIG. 9.

In FIGS. 3 and 4, the base 7 is in a starting rotation position AD. As a result, the processing elements 9 are in the starting positions A. If the base 7 is rotated from the starting rotation position AD through, for example, 20 degrees, the processing elements 9 are pivoted from the respective starting position A into the respective, first intermediate position Z1 as a result, as is shown in FIGS. 5 and 6. If the base 7 is rotated, for example, from the starting rotation position AD through 45 degrees, the processing elements 9 are pivoted, for example, into the respective, second intermediate position Z2 as a result, as can be seen in FIGS. 7 and 8. If the base 7 is rotated from the starting rotation position AD through, for example, 45 degrees, the processing elements 9 are pivoted into the respective folded-over position U as a result, as is shown in FIGS. 9 and 10. In order to fold over the contacting lugs 5, the processing elements 9 are pivoted, and consequently moved, by the described rotation of the base 7 from the respective starting position A into the respective folded-over position U.

The base 7 has a first tooth system 14 into which a second tooth system 15 of a gear wheel 16, also referred to as a pinion, engages. For example, the gear wheel 16 is rotated, in particular by an electric motor, about a gear wheel rotation axis, in particular relative to the electrode winding 1, where the gear wheel rotation axis runs parallel to the base rotation axis 8 and parallel to the element rotation axes 10 and is spaced apart from the base rotation axis 8 and from the respective element rotation axes 10. Owing to rotation of the gear wheel 16, the base 7 is rotated relative to the electrode winding 1 about the base rotation axis 8, as a result of which the processing elements 9 are pivoted from the respective starting position A into the respective folded-over position U. As a result, the contacting lugs 5 are folded over, in particular bent over, in particular at the same time, in particular in the direction of the winding axis 6 and therefore in the direction of the base rotation axis 8. As a consequence, for example, the folded-over contacting lugs can be mechanically and electrically connected, in particular welded, to a contact element, formed separately from the electrode foil 3, over a particularly large surface area, as a result of which a particularly advantageous and secure connection of the contacting lugs 5 to the contact element can be realized.

LIST OF REFERENCE SIGNS

1 Electrode winding
2 Processing device
3 Electrode foil
4 Main body
5 Contacting lug
6 Winding axis
7 Base
8 Base rotation axis
9 Processing element
10 Element rotation axis
11 Guide
12 Projection
13 Base body
14 First tooth system
15 Second tooth system
16 Gear wheel
A Starting position
AD Starting rotation position
S1 First end side
S2 Second end side
U Folded-over position
Z1 First intermediate position
Z2 Second intermediate position

The invention claimed is:
1. A method for producing a storage cell for an electrical energy store, the method comprising:

providing an electrode winding comprising an electrode foil wound up to form the electrode winding and a processing device, the processing device comprising:

a base rotatable about a base rotation axis;

processing elements, each processing element being rotatable relative to the base about a respective element rotation axis running parallel to the base rotation axis and spaced apart from the base rotation axis; and a respective arcuate guide of the base associated with the respective processing element and being rotatable relative to the element rotation axes about the base rotation axis; and rotating the base relative to the electrode winding, relative to the element rotation axes and relative to the processing elements about the base rotation axis, whereby a respective pivoting movement of the processing elements about the element rotation axes occurs, the pivoting movement occurring relative to the electrode winding, relative to the base and in a direction of the base rotation axis, the pivoting movements being implemented by the arcuate guides, wherein a subregion arranged on an end side of the electrode foil is folded over by the processing elements as a result of the pivoting movements of the processing elements.

2. The method according to claim 1, wherein the subregion comprises contacting lugs protruding from a main body of the electrode foil.

3. The method according to claim 1, wherein the respective arcuate guide is ellipsoidal.

4. The method according to claim 1, wherein rotating the base comprises:

rotating a gear wheel about a gear wheel rotation axis running parallel to the base rotation axis and parallel to the respective element rotation axis, and being spaced apart from the base rotation axis and from the respective element rotation axis, wherein the base has a first tooth system into which a second tooth system of the gear wheel engages, whereby the base is driven and thereby rotated about the base rotation axis.

5. The method according to claim 1, wherein the subregion, after it has been folded over, is mechanically and electrically connected to a contact element formed separately from the subregion.

6. The method according to claim 5, wherein the subregion is welded to the contact element and thereby mechanically and electrically connected to the contact element.

7. The method according to claim 1, wherein the subregion is formed from a metal material.

8. The method according to claim 1, further comprising: providing an electric motor, wherein the base is rotated about the base rotation axis by the electric motor.

9. A processing device for producing a storage cell for an electrical energy storage device, the processing device comprising:

a base rotatable about a base rotation axis; and processing elements, each processing element being rotatable relative to the base about a respective element rotation axis running parallel to the base rotation axis and spaced apart from the base rotation axis;

a respective arcuate guide of the base engaged with the respective processing element and being rotatable relative to the element rotation axes and relative to the processing elements about the base rotation axis, wherein, when the base is rotated relative to the element rotation axes and relative to the processing elements about the base rotation axis, a respective pivoting movement of the processing elements takes place relative to the base and in a direction of the base rotation axis implemented by the arcuate guides.

10. A method of using the processing device according to claim 9 to produce a storage cell for an electrical energy storage device.

* * * * *